(12) United States Patent
Tseng

(10) Patent No.: US 8,188,666 B2
(45) Date of Patent: May 29, 2012

(54) CONTROL CIRCUIT FOR ADJUSTING BACKLIGHT

(75) Inventor: Ping-Chung Tseng, Taipei County (TW)

(73) Assignee: Acewell International Co., Ltd., Taoyuan County (TW)

( * ) Notice: Subject to any disclaimer, the term of this patent is extended or adjusted under 35 U.S.C. 154(b) by 441 days.

(21) Appl. No.: 12/558,360

(22) Filed: Sep. 11, 2009

(65) Prior Publication Data

US 2010/0072911 A1  Mar. 25, 2010

(30) Foreign Application Priority Data

Sep. 22, 2008 (TW) .............................. 97136378 A

(51) Int. Cl.
*B60Q 1/26* (2006.01)

(52) U.S. Cl. ............ 315/80; 315/77; 315/291; 315/302; 315/312

(58) Field of Classification Search ........................ None
See application file for complete search history.

(56) References Cited

U.S. PATENT DOCUMENTS 7,148,632 B2 * 12/2006 Berman et al. ................ 315/189
2007/0188427 A1 * 8/2007 Lys et al. ........................ 345/82

* cited by examiner

*Primary Examiner* — Anh Tran

(57) ABSTRACT

A control circuit for adjusting a backlight color is provided. In accordance with a preferred embodiment, the control circuit comprises an input device, a control unit, a backlight, and a plurality of pulse-width modulation units. The input device receives a plurality of external messages to generate a corresponding plurality of control signals. The control unit has a plurality of pins, implements a plurality of calculations based on the plurality of control signals, and generates a plurality of light-adjusting signals, each of which has a respective pulse width. The backlight has a plurality of light sources for a color mixing. Each of the pulse-width modulation units is correspondingly coupled to each of the pins and to each of the light sources, and adjusts a light of the each light source based on the respective pulse width.

20 Claims, 9 Drawing Sheets

CONTROL CIRCUIT FOR ADJUSTING BACKLIGHT

FIELD OF THE INVENTION

The present invention relates to a control circuit for adjusting a backlight color, and more particularly to a control circuit for adjusting a backlight color of dashboards for automobiles.

BACKGROUND OF THE INVENTION

The dashboard is one kind of control panel disposed underneath the windshield of an automobile. Typically, a dashboard is furnished with several data indicators for the driver to refer to when driving a car. FIG. 1 shows an outlook of the typical dashboards. According to FIG. 1, the data indicators provide information such as car speed, fuel gauge, shifting-gear position, seatbelt warning and etc, to show the driving conditions of the car. To facilitate the need of driving at night, the dashboards are further equipped with light control equipment.

Some carmakers have disposed digital readout indicators assisted with light-emitting functions on the dashboards. One popular case is a backlight illuminator. It is known to the people in this art, the backlight illuminator is used for increasing the lighting. The backlight color can be selected from a variety of different colors. For a monochroic liquid crystal as a backlight, usually there could be yellow, green, blue, white or else. The white light is used for color screens, for the white light includes most of the light colors. It is to be described that the light source for the backlight may be light bulbs, ELP, LED, CCFL and etc.

Taking the LED for example, the LED backlights are utilized at LCP panels, which is compact and cost-effective as well. The backlights increase the color performed by the LCD panels. The LED light is generated by three individual red, blue and green LED, which provides a color spectrum that sufficiently matches the color spectrum of the color filter of the LCD.

However, the light intensity control of the indicators assisted with light-emitting functions on the dashboards is pre-determined by the manufactures. The driver cannot adjust the light intensity of the dashboard based on the lighting condition inside the car, which may result in a potential danger when driving. Therefore, it is necessary to provide a control circuit that is capable for adjusting a backlight color of dashboards for automobiles.

SUMMARY OF THE INVENTION

To overcome the abovementioned issues, the present invention provides a control circuit for adjusting a backlight color. In accordance with a preferred embodiment, the control circuit comprises an input device, a control unit, a backlight, and a plurality of pulse-width modulation (PWM) units. The input device receives a plurality of external messages to generate a corresponding plurality of control signals. The control unit has a plurality of pins, implements a plurality of calculations based on the plurality of control signals, and generates a plurality of light-adjusting signals, each of which has a respective pulse width. The backlight has a plurality of light sources for a color mixing. Each of the pulse-width modulation units is correspondingly coupled to each of the pins and to each of the light sources, and adjusts a light of the each light source based on the respective pulse width. Preferably, the input device is one selected from a group consisting of a push buttons, a touch panel and a keyboard.

In accordance with the abovementioned control circuit for adjusting a backlight color, preferably, the control circuit further comprising a display device, wherein the control unit generates a plurality of display signals, the display device displays the light of the each light source based on the display signals, and the display device comprises one of a seven-segment liquid crystal displays and a plurality of seven-segment light emitting devices (LED) displays.

Preferably, the light sources comprise a red LED, a green LED and a blue LED.

Preferably, the each PWM unit comprises a switch and a resistor electrically connected to each other, and the switch is a transistor.

Preferably, the transistor is one selected from a group consisting of an NPN bipolar junction transistor, a PNP bipolar junction transistor and a field effect transistor.

Preferably, the transistor is conductive for a time period based on the respective pulse width.

In accordance with another aspect of the present invention, a control circuit for adjusting a backlight is provided. The control circuit comprises and input device, a control unit, the backlight, and an adjusting unit. The input device receives a plurality of external messages to generate a corresponding plurality of control signals. The control unit generates a plurality of light-adjusting signals, each of which has a respective pulse width. The adjusting unit is electrically connected to the control unit and the backlight, and adjusts the backlight based on the respective pulse width.

Preferably, the adjusting unit is a PWM unit, and the control circuit adjusts a color of the backlight.

Preferably, the control unit has a plurality of pins, receives a plurality of control signals, implement a plurality of calculations based on the plurality of control signals, and generates a plurality of display signals.

Preferably, further comprising a display device coupled to the pins of the control unit, and displaying a light based on the display signals from the control unit.

In accordance with a further aspect of the present invention, a method for adjusting a backlight is provided, wherein the backlight has a plurality of light sources for a color mixing. The method comprises steps of receiving a plurality of external messages to generate corresponding plurality of control signals, generating a plurality of light-adjusting signals based on the control signals, receiving the plurality of light-adjusting signals utilizing a plurality of PWM units, wherein each of the light-adjusting signals has a respective pulse width, and adjusting each of the light sources by using the respective PWM unit based on the respective pulse width.

Preferably, the light sources comprise a red LED, a green LED and a blue LED, and the respective PWM unit adjusts a luminance of each of the light sources.

Preferably, each of the PWM units comprises a switch and a resistor electrically connected to each other, and the switch is a transistor.

Preferably, the transistor is one selected from a group consisting of an NPN bipolar junction transistor, a PNP bipolar junction transistor and a field effect transistor.

Preferably, each of the transistors is conductive for a time period based on the respective pulse width.

Preferably, the method further comprises the step of implementing at least a calculation to generate at least a light-adjusting signal based on at least a control signal.

The above objects and advantages of the present invention will be more readily apparent to those ordinarily skilled in the

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
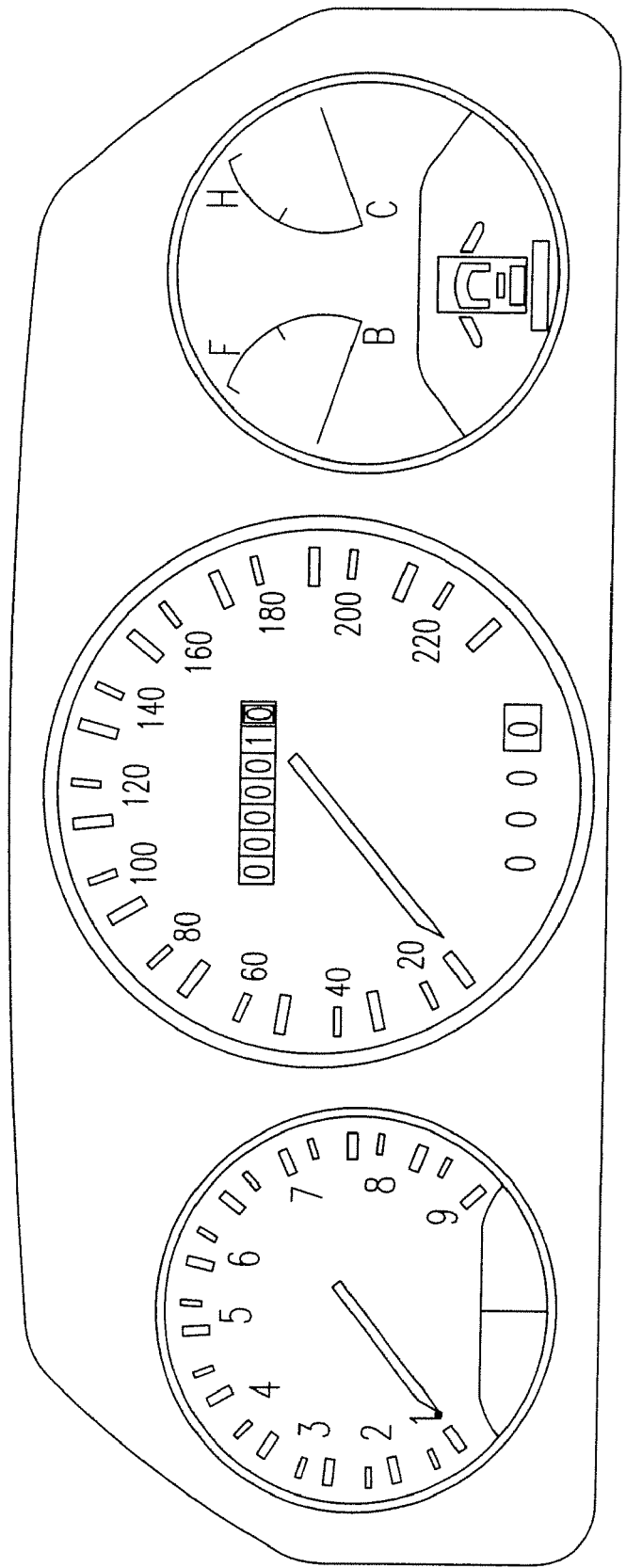
FIG. 1 is a schematic diagram showing an outlook of the typical dashboards in the prior art.
Figure 2A:
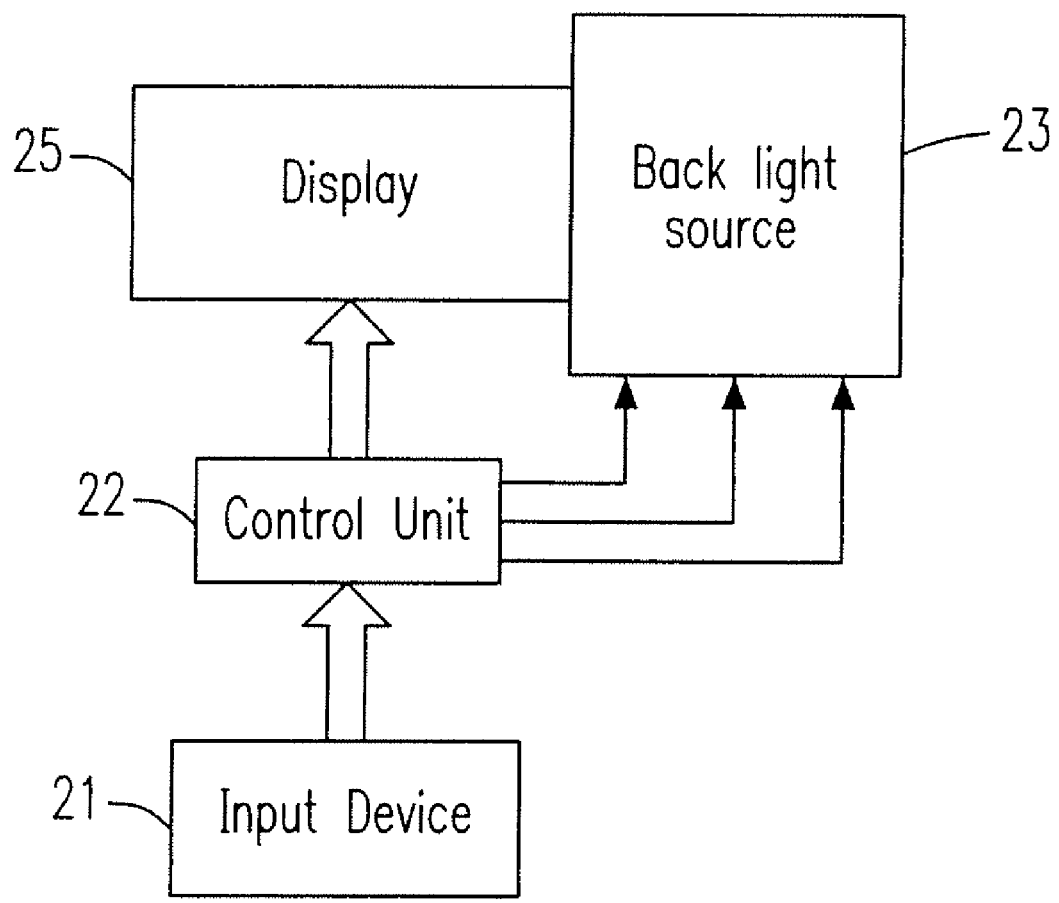
FIG. 2a is a block diagram showing a layout of the control circuit according to a preferred embodiment of the present invention.

Taking advantage of conventional backlight technique, the present invention provides a control circuit that is capable for adjusting a backlight color of dashboards for automobiles. Please refer to FIGS. 2a and 2b, the control circuit 2 comprises an input device 21, a microcontroller unit 22 having a plurality of pins, a backlight source 23. The backlight 23 comprises a plurality of light sources including a red LED 231, a green LED 232 and a blue LED 233. This embodiment also comprises a plurality of pulse-width modulation (PWM) units 24 and a display device 25. For the present example of embodiment, three PWM (which are a first PWM 241, a second PWM 242 and a third PWM 243, correspond to red, green and blue respectively) are disposed in the control circuit 2. The display device 25 comprises a plurality of seven-segment LCD or a plurality of seven-segment LED. Refer to FIG. 3, for the illustration of the display device 25 that is illuminated according to the red LED 231, the green LED 232 and the blue LED 233, six seven-segment LED displays, namely L1, L2, L3, L4, L5 and L6, are utilized. The L2, the L4 and the L6 indicate a measurement of the light of red, green and blue, respectively. Preferably, the measurement of the light is related to a light intensity. And preferably, the light intensity is a luminance. A dash is disposed to the left of each of the L2, he L4 and the L6, respectively. The L2, L4 and L6 indicate a dismal value of the measurement of the light, which has eight different levels from 0 to 7 for example.

Figure 4:
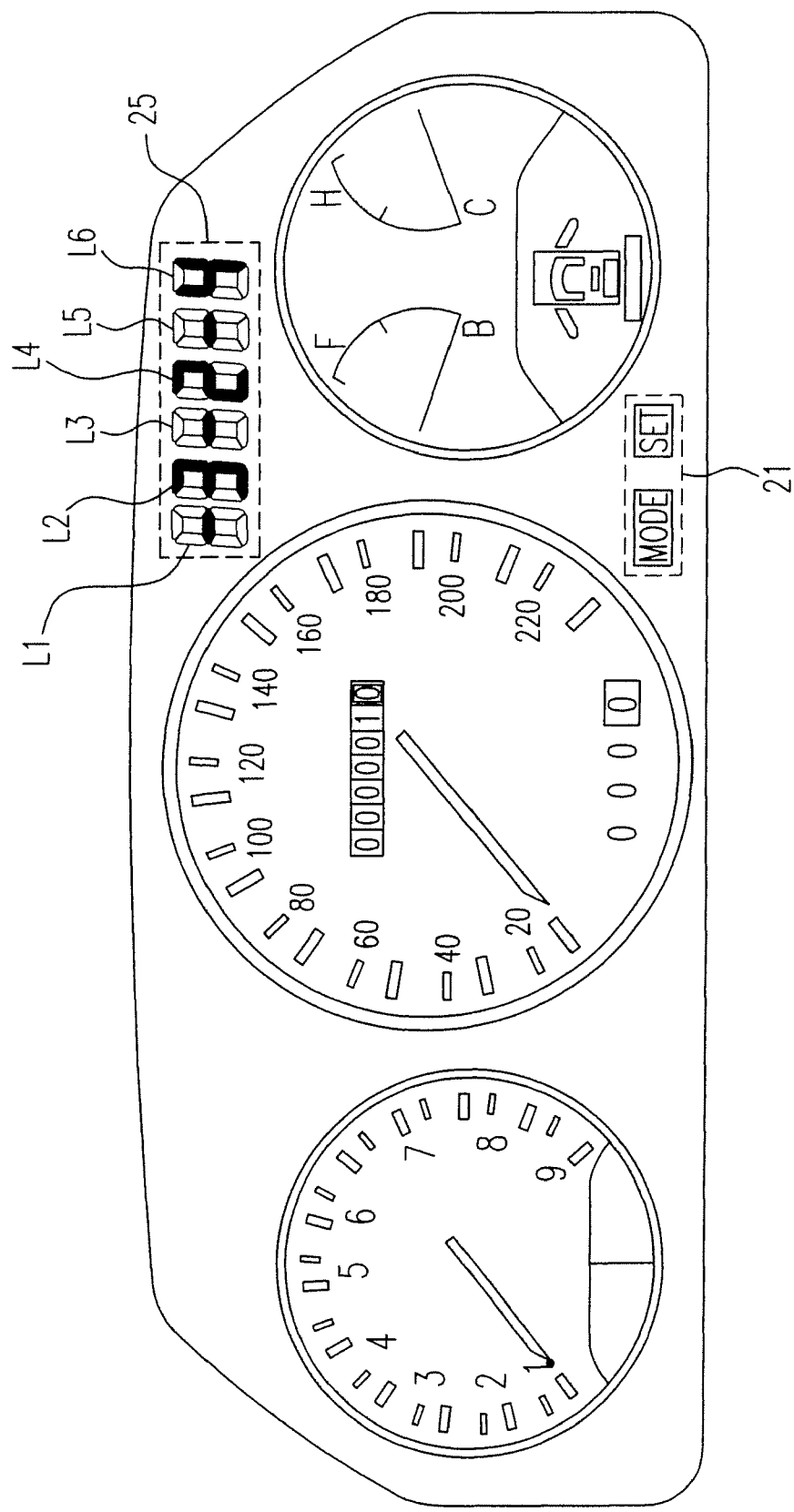
FIG. 4 is a schematic diagram showing an outlook of the dashboards of an automobile, when the lighting indicated on the dashboard for red, green and blue are respectively 3, 2 and 4, according to a preferred embodiment of the present invention.

Please refer to FIG. 4, which is a schematic diagram showing an outlook of the dashboards of an automobile, with the aid of the input device 21 and the display device 25, according to a preferred embodiment of the present invention. The input device 21 is disposed at a location of the dashboard and is a push buttons, a touch panel or a keyboard. When a user touches the input device 21 for one time or more, the input device 21 generates a control signal correspondingly.

The embodiment of the input device 21 is not limited to the mentioned examples. Any type of sensor receiving a message from the external is considered as a practice of the input device 21, no matter the message is directed controlled from the user or not. Thus, the message can be a word or a sound. For illustration the embodiment of the present invention, two push buttons indicated with the words "SET" and "MODE" are disposed at the input device 21, referring to FIGS. 2b and 4. When the user tends to adjust the display color of the dashboard or choose other functions, he/she may push the "SET" and the "MODE" buttons to generate corresponding control signals. In other words, the input device 21 receives a plurality of external messages to generate a corresponding plurality of control signals.

According to the descriptions set forth above, more precisely, pressing the MODE button is to select one of the red, green or blue LED, and pressing the SET button is to adjust the chrominance of the light of the selected LED. When the MODE button is pressed, a first switch SW1 in the control circuit 2 is correspondingly at a status of turned on, the first switch SW2 synchronously generates a first mode control signal MODE1 that is indicated as a binary signal "1", and the first mode control signal MODE1 is transmitted to the microcontroller unit 22 via a pin PA3, for signal processing. When the SET button is pressed, a second switch SW2 in the control circuit 2 is correspondingly at a status of turned on, the second switch SW2 generates a first setting control signal that is indicated as a binary signal "1", and the first setting control signal SET1 is transmitted to the microcontroller unit 22 via a pin PA4, for signal processing. It can be also derived that, when pressed by a number of times, the first and the second switches SW1 and SW2 generates corresponding mode control signals and setting control signals.

Upon receiving the first control signal MODE1 from the pin PA3 and the first setting signal SET1 from the pin PA4, the microcontroller unit 22 processes to produce a set of programming codes in accordance with computer languages such as assembly languages, C or C++, or high-level computer languages and record the programming codes into a memory device (not shown) of the microcontroller unit 22. The memory device is one selected from a group consisting of a RAM, an EPROM, an OTPROM, a Flash memory and an EEPROM.

It is comprehensible to the skilled person in this art that, the set of the programming codes is related to the data information of the light intensities of the red, green and blue light displayed by the backlight 23 and the display device 25, and the micro controller 22 further comprises an arithmetic logic unit (ALU, not shown). When the first mode control signal MODE1 from the pin PA3 and the first setting control signal from the pin PA4 continually transmitted into the ALU, the ALU reads the data information recorded in the memory device and acquires new data information regarding the light intensities of the red, green and blue light displayed by the backlight 23 and the display device 25. Afterwards, the ALU writes the new data information into the memory device to revise the data information and simultaneously transmits the new data information to pins PA2, PA0 and PA1, which is corresponding to red, green and blue LED, and to the six seven-segment LCD displays L1-L6, based on the corresponding programming codes.

Again, referring to FIGS. 2b and 3, the operational relations between the seven-segment LCD displays L1-L6 and the micro controller 22 are described as follows.

Each of the seven-segment LCD displays has a first segment, a second segment, a third segment, a fourth segment, a fifth segment and a sixth segment, which is indicated by the letter from a to g according to the alphabetic sequence. To distinguish the segments of each of the seven-segment LCD displays, a numeric sub-index is applied to segments. For example, the first segment of the seven-segment LCD display L2 is indicated as a2, and the seventh segment of the L1 is g1. Each of the L1, L3 and L3 indicates a dash "-". The L2 indicates the data information of the light intensity of the red LED 231. The L4 indicates the data information of the light intensity of the green LED 232. The L6 indicates the data information of the light intensity of the blue LED 233. Each of the segments in each seven-segment LCD display receives the revised data information from the memory device via pins S0~S11 and C0~C3.

Figure 2B:
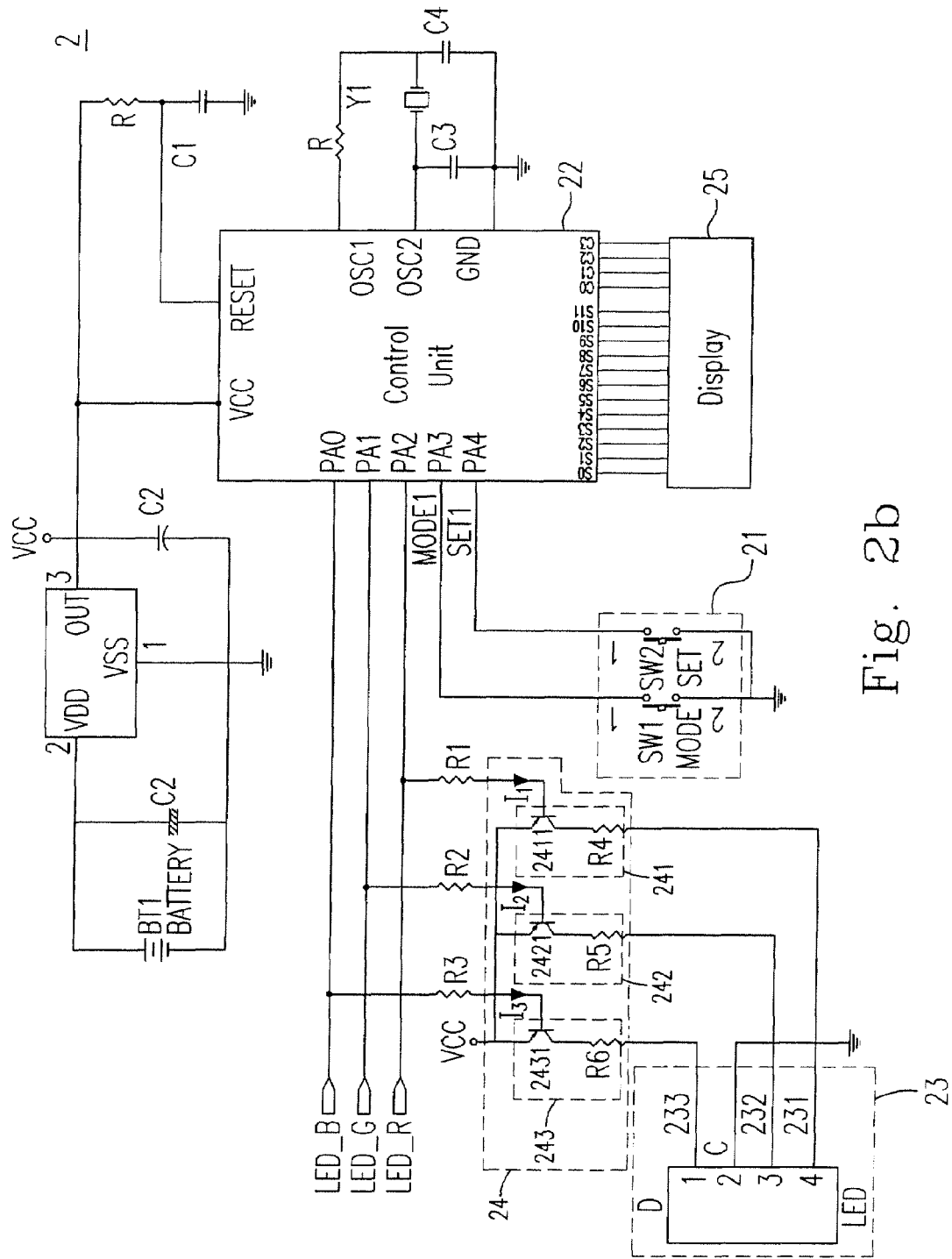
FIG. 2b is a circuit diagram showing a layout of the control circuit according to a preferred embodiment of the present invention.
Figure 3:
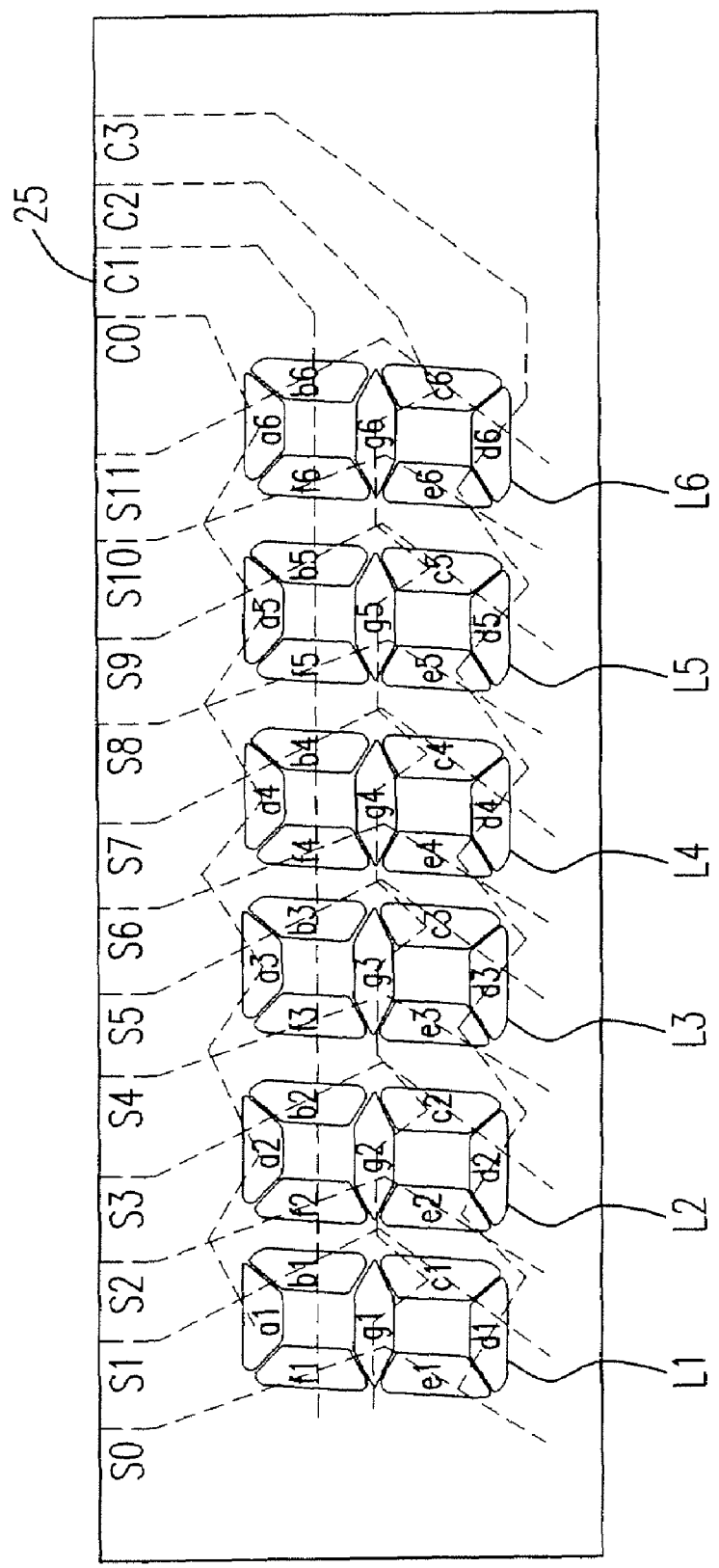
FIG. 3 is a schematic diagram showing the six seven-segment LED displays according to a preferred embodiment of the present invention.

Referring to FIGS. 2b and 4, if the original light intensity data shown on the seven-segment LCD displays is "-3-2-4" (-red-green-blue) and the user tends to increase the intensity of the red light, he/she may press the first switch SW1 once to generate the first mode control signal MODE1 and then presses the second switch SW2 to generate the first setting control signal SET1 (which is "1" as indicated by binary code). The control signals, SET 1 and MODE1, are transmitted to the ALU for processing, via the corresponding circuits in the micro controller 22. Each of the color, say red, green and blue, is displayed by means of the 8-bit color technique, which is able to display the colors at 256 levels of chrominance. The 256 levels are equally divided into eight intensity levels, namely level 0 to level 7, according to a preferred embodiment of the present invention. For example, when the L2 shows a "1", the chrominance of the red light is 256/8*1. When the L2 shows a "3", the chrominance of the red light is 256/8*3.

Figure 5:
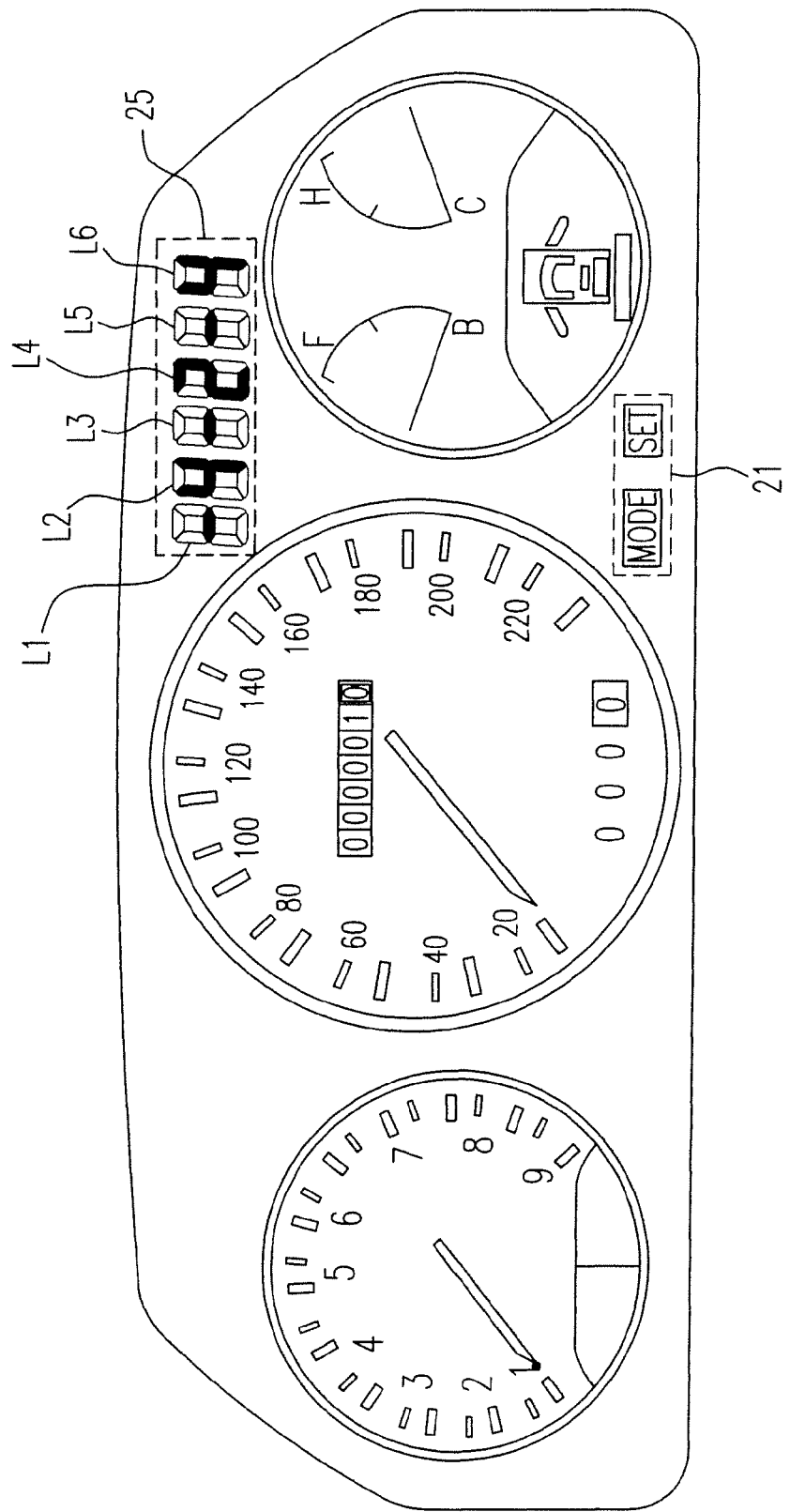
FIG. 5 is a schematic diagram showing an outlook of the dashboards of an automobile, when the lighting indicated on the dashboard for red, green and blue are respectively 4, 2 and 4, according to a preferred embodiment of the present invention.

Therefore, when the ALU reads the light intensity data information that is 3 for the first mode control signal MODE1 and 3 (which is "1" as indicated by binary code) for the first setting control signal SET1, and performs an calculation of adding to obtain a new data of light intensity of the light source for red light is 4. Then the ALU writes the new data (4) into the memory device. The data is transmitted to the L2 via the memory device, to revise the data information indicating the light intensity of the red. Accordingly, the segments a2 to a7 is determined to be illuminated or not, depending on the data information regarding the light intensity transmitted via the pins S2, S3, and C0~C3 of the micro controller 22. According to FIGS. 2 and 5, when the light intensity is 4, the segments f2, g2, b2 and c2 of L2 are illuminated. Meanwhile, the data information indicated in L4 and L6 remain unchanged.

Figure 6:
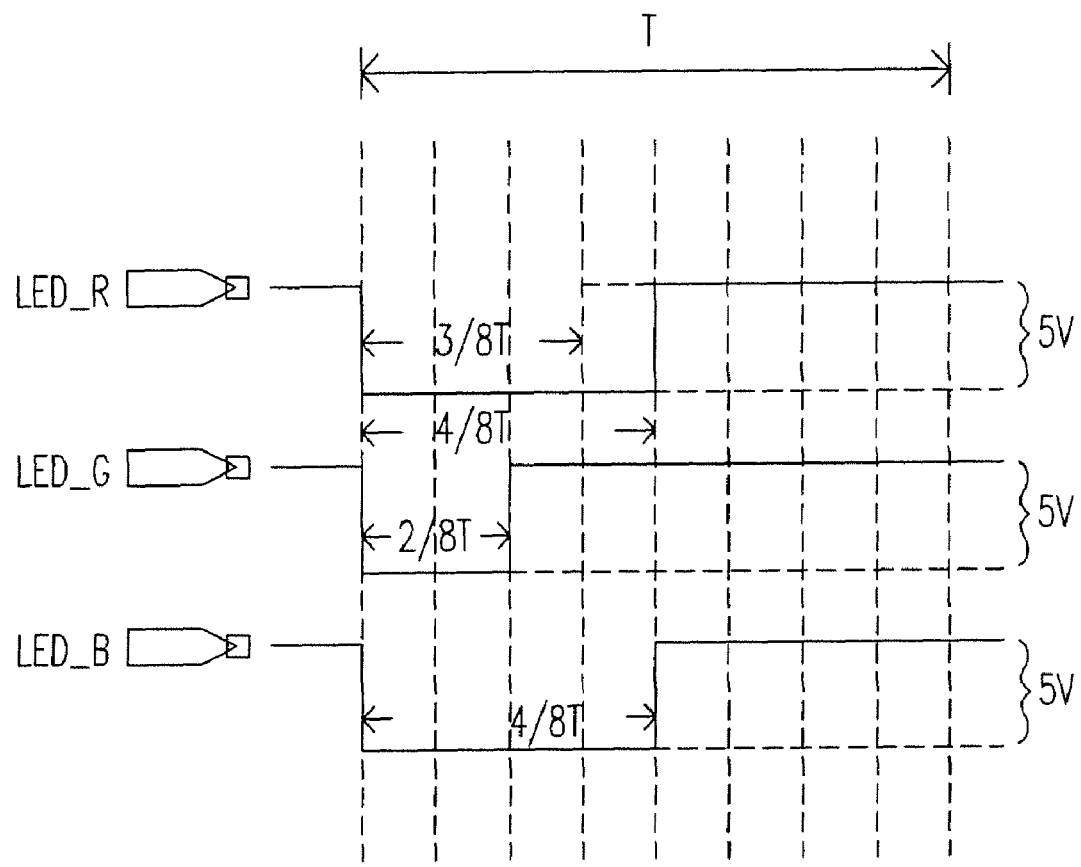
FIG. 6 is a schematic diagram showing the waveforms of the control signals, according to a preferred embodiment of the present invention.

Please refer to FIG. 2b and FIG. 6, which is a schematic diagram showing the waveforms of the control signals. A set of the data information stored in the memory device corresponding to the light intensity, says -4-2-4 according to the abovementioned example, comprises a first, a second and a third square waves, which are respectively transmitted via pins PA2, PA1 and PA0 of the micro controller unit 22 to the first PWM 241, the second PWM 242 and the third PWM 243, to implement corresponding signal processing. The first, the second and the third square waves are respectively a light adjusting signal for red, a light adjusting signal for green and a light adjusting signal for blue. Each of the PWM units comprises a switch and a resister electrically connected to the switch. According to FIG. 6, a full period of time T is equally divided into 8 segments, preferably. When the user intend to change the light intensity level of the red LED 231 from 3 to 4, a low voltage level period of the first square wave transmitted from the pin PA2 is changed from ⅜ of the T to ⅘ of the T. In the mean time, the low voltage level period of the second wave transmitted from the pin PA1 remains at ⅔ of the T, and that of the third wave transmitted from the PA0 remains at ⅘ of the T.

The type of the abovementioned switches is a transistor. The transistor is one selected from a group consisting of an NPN bipolar junction transistor (BJT), a PNP BJT and a field effect transistor. According to the present embodiment, a PNP BJT is chosen as an example.

Typically, a PNP BJT has three poles, an emitter, a base and a collector. According to FIG. 2b, the base of a first PNP BJT 2411 in the first PWM unit 241 receives the first square wave (having the low voltage level period of ⅘ T), which triggers a first base current I1 due to a bias provided from a first resistor R1, from the pin PA2 of the micro control unit 22. The base of the second PNP BJT 2421 in the second PWM unit 242 receives the second squire wave (having the low voltage level period of ⅔ T), which triggers a second base current I2 due to a bias provided from a second resistor R2, from the pin PA1. The base of the third PNP BJT 2431 in the third PWM unit receives the third squire wave (having the low voltage level period of ⅘ T), which triggers a third base current I3 due to a bias provided from a third resistor R3, from the pin PA0 of the micro control unit 22.

Basically, the PNP type BJT is one kind of current-driven unit. For each of the PNP BJT switches, when any of the base current I1, I2 and I3 is generated and the current value thereof is above zero, the switches will be turned on. It is to be described that, the time period of staying on for the PNP BJT switches depends on that of the low voltage level period of the square wave that triggers the corresponding base current. Accordingly, when the low voltage level period of the first square wave transmitted from the pin PA2 is changed from ⅜ of the T to ⅘ of the T, the time period for the PNP BJT switch 2411 being on is increased from ⅜ of the T to ⅘ of the T.

A working voltage Vcc of five volt is applied to the emitter of each of the PNP BJT 2411, 2421 and 2431. When any one of the PNP BJT is switched on, a collector bias voltage Vec (not shown) is generated and provides electric power to the LED. To avoid a potential burnt off for the LED, which are electrically connected between the collectors of the PNP BJT and a ground, resistors R4, R5 and R6 are respectively disposed between each collector of the PNP BJT and the corresponding LED 231, 232 and 233. Since the time periods for the PNP BJT switches 2411, 2421 and 2431 being on are proportional to the low voltage level period of the corresponding square waves that trigger the base currents I1, I2 and I3, the time periods of the collector bias voltage Vec that illuminates the LED 231, 232 and 233 are also proportional to the low voltage level period of the corresponding square waves. Therefore, the first, the second and the third square waves are respectively a light-adjusting signal for the red LED 231, a light-adjusting signal for the green LED 232 and a light-adjusting signal for the blue LED 233. Based on different combinations of the intensities of the red, green and blue LED, a variety of color mixing for the backlight is realized.

Therefore, the purpose of the present invention for providing a control circuit for adjusting a backlight color achieved.

Figure 7:
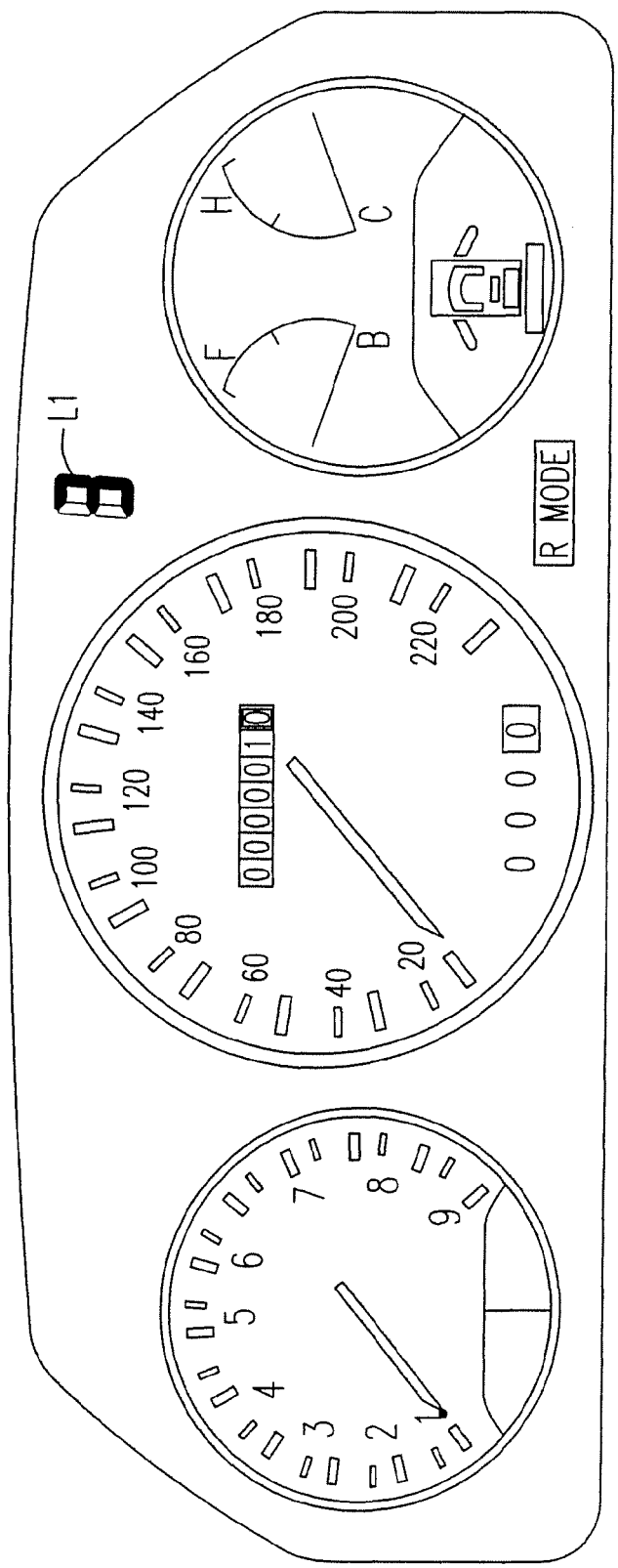
FIG. 7 is a schematic diagram showing an outlook of the dashboards of an automobile, according to another preferred embodiment of the present invention.
Figure 8:
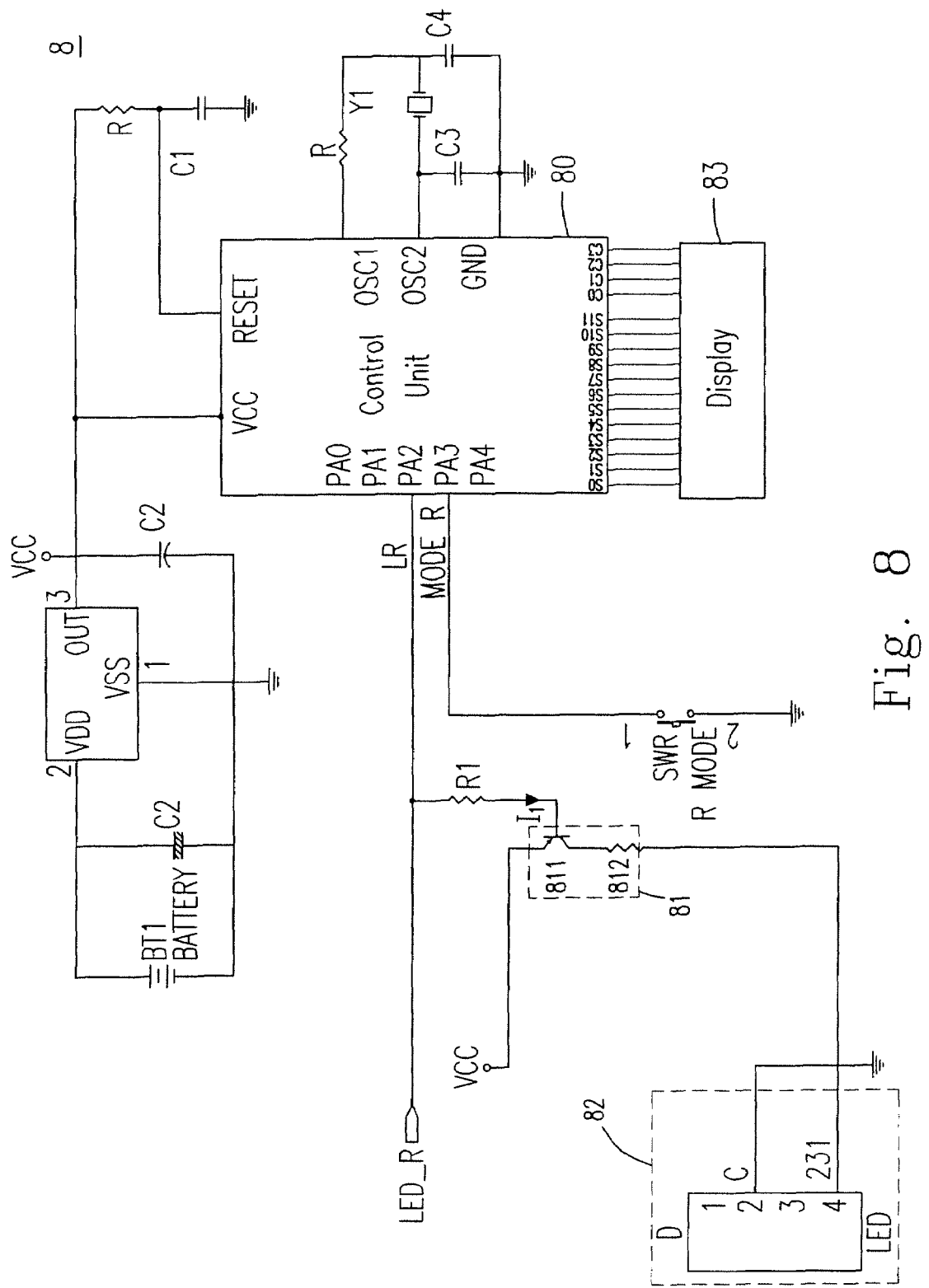
FIG. 8 is a circuit diagram showing a layout of the control circuit according to another preferred embodiment of the present invention.

As for a backlight utilizing a sore light source such as a red LED, a green LED or a blue LED, another embodiment of the present invention is provided. Referring to FIGS. 7 and 8 and compared with FIG. 2b, a signal push button SWR is utilized as the input device 21 for receiving a plurality of external messages. A control circuit 8 comprises the push button SWR, a micro control unit 80 having a plurality of pins, a pulse-width modulation (PWM) unit 81, a backlight source 82 and a display device 83. The PWM unit 81 comprises a resistor 812 and a switch 811. The type of the switch is a transistor. The transistor is one selected from a group consisting of an NPN bipolar junction transistor (BJT), a PNP BJT and a field effect transistor. The backlight source 82 comprises an LED. The display device 83 comprises a seven-segment LCD or a seven-segment LED. The operation process of the control circuit 8 is the same with that of the control circuit 2, so there is no need to repeat.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims that are to be accorded with the broadest interpretation so as to encompass all such modifications and similar structures.

What is claimed is:

1. A control circuit for adjusting a backlight color, comprising:
   an input device receiving a plurality of external messages to generate a corresponding plurality of control signals;
   a control unit having a plurality of pins, implementing a plurality of calculations based on the plurality of control signals, and simultaneously generating a plurality of light-adjusting signals, each of which has a respective pulse width;
   a backlight having a plurality of light sources for a color mixing;
   a plurality of pulse-width modulation (PWM) units, each of which is correspondingly coupled to each of the pins and to each of the light sources, and adjusts a light of the each light source based on the respective pulse width; and
   a display device, wherein the control unit generates a plurality of display signals, and the display device displays the light of the each light source based on the display signals.

2. A control circuit as claimed in claim 1, wherein the input device is one selected from a group consisting of a push buttons, a touch panel and a keyboard.

3. A control circuit as claimed in claim 1, wherein the display device comprises one of a seven-segment liquid crystal displays and a plurality of seven-segment light emitting device (LED) displays.

4. A control circuit as claimed in claim 1, wherein the light sources comprise a red LED, a green LED and a blue LED.

5. A control circuit as claimed in claim 1, wherein the each PWM unit comprises a switch and a resistor electrically connected to each other.

6. A control circuit as claimed in claim 5, wherein the switch is a transistor.

7. A control circuit as claimed in claim 6, wherein the transistor is one selected from a group consisting of an NPN bipolar junction transistor, a PNP bipolar junction transistor and a field effect transistor.

8. A control circuit as claimed in claim 6, wherein the transistor is conductive for a time period based on the respective pulse width.

9. A control circuit for adjusting a backlight, comprising:
   an input device for receiving a plurality of external messages to generate a corresponding plurality of control signals;
   a control unit receiving a plurality of control signals, implementing a plurality of calculations based on the plurality of control signals, generating a plurality of display signals, and generating a plurality of light-adjusting signals, each of which has a respective pulse width;
   the backlight; and
   an adjusting unit electrically connected to the control unit and the backlight, and adjusting the backlight based on the respective pulse width.

10. A control circuit as claimed in claim 9, wherein the adjusting unit is a PWM unit, and the control circuit adjusts a color of the backlight.

11. A control circuit as claimed in claim 9, wherein the control unit has a plurality of pins.

12. A control circuit as claimed in claim 11 further comprising a display device coupled to the pins of the control unit, and displaying a light based on the display signals from the control unit.

13. A method for adjusting a backlight, wherein the backlight has a plurality of light sources for a color mixing, the method comprising steps of:
   receiving a plurality of external messages to generate corresponding plurality of control signals;
   implementing a plurality of calculations to generate a plurality of display signals based on the plurality of control signals;
   generating a plurality of light-adjusting signals based on the control signals;
   receiving the plurality of light-adjusting signals utilizing a plurality of PWM units, wherein each of the light-adjusting signals has a respective pulse width; and
   adjusting each of the light sources by using the respective PWM unit based on the respective pulse width.

14. A method as claimed in claim 13, wherein the light sources comprise a red LED, a green LED and a blue LED.

15. A method as claimed in claim 13, wherein the measurement of each of the light sources is a luminance.

16. A method as claimed in claim 15, wherein each of the PWM units comprises a switch and a resistor electrically connected to each other.

17. A method as claimed in claim 16, wherein the switch is a transistor.

18. A method as claimed in claim 17, wherein the transistor is one selected from a group consisting of an NPN bipolar junction transistor, a PNP bipolar junction transistor and a field effect transistor.

19. A color control method as claimed in claim 17, wherein each of the transistors is conductive for a time period based on the respective pulse width.

20. A method as claimed in claim 13, further comprising the step of:
   implementing at least a calculation to generate at least a light-adjusting signal based on at least a control signal.

* * * * *